(12) United States Patent
Thorn et al.

(10) Patent No.: US 12,743,966 B2
(45) Date of Patent: Sep. 22, 2026

(54) EYE-IMAGING TRAINING APPARATUS AND METHODS OF TRAINING

(71) Applicant: Phoenix-Micron, Inc., Bend, OR (US)

(72) Inventors: Jonathan Roy Thorn, Bend, OR (US); Jonathan Scott Carr, Bend, OR (US); Leslie Mackeen, Toronto (CA)

(73) Assignee: Phoenix-Micron, Inc., Bend, OR (US)

( * ) Notice: Subject to any disclaimer, the term of this patent is extended or adjusted under 35 U.S.C. 154(b) by 249 days.

(21) Appl. No.: 18/377,271

(22) Filed: Oct. 5, 2023

(65) Prior Publication Data

US 2024/0127716 A1 Apr. 18, 2024

Related U.S. Application Data

(60) Provisional application No. 63/416,356, filed on Oct. 14, 2022.

(51) Int. Cl.
*G09B 23/28* (2006.01)
*G09B 23/32* (2006.01)
*G09B 23/34* (2006.01)

(52) U.S. Cl.
CPC .......... *G09B 23/286* (2013.01); *G09B 23/32* (2013.01); *G09B 23/34* (2013.01)

(58) Field of Classification Search
CPC .............................. G09B 23/286; G09B 23/32
See application file for complete search history.

(56) References Cited

U.S. PATENT DOCUMENTS 6,077,083 A 6/2000 Smith-Whitley et al.
2009/0111081 A1 4/2009 Nylen
2018/0350269 A1 12/2018 Gada et al.
2020/0135056 A1 4/2020 Omata et al.
2021/0142696 A1 5/2021 Omata et al.
2022/0000356 A1 1/2022 Lee et al.
2022/0133212 A1* 5/2022 Krueger ............... A61B 3/0041 600/301
2022/0270515 A1 8/2022 Slabber et al.

OTHER PUBLICATIONS

EP25158259.9, "Extended European Search Report", May 12, 2025, 11 pages.
EP23202474.5, "Extended European Search Report", Mar. 12, 2024, 5 pages.
EP23202474.5, "Intention to Grant", Sep. 23, 2024, 8 pages.
EP25158259.9, "Office Action", Jan. 12, 2026, 6 pages.

* cited by examiner

*Primary Examiner* — Kesha Frisby
(74) *Attorney, Agent, or Firm* — Kilpatrick Townsend & Stockton LLP

(57) ABSTRACT

The present disclosure provides an eye-imaging training apparatus including an actuator to articulate one or more movable eyeball members. The eye-imaging training apparatus provides a caregiver a training tool for practicing various eye-imaging techniques that simulate or mimic natural and animal-like eye movement. For example, the eye-imaging training apparatus may include an eyeball member that can move in multiple directions to simulate human-like eye movement. The eye-imaging training apparatus can train a caregiver to practice, for example, aligning an eye-imaging camera, calibrating the eye-imaging camera (e.g., determining the desired optical parameters), and retracting eyelids for eye-imaging. The present disclosure is also related to systems and methods for eye imaging using an eye-imaging training apparatus.

20 Claims, 16 Drawing Sheets

EYE-IMAGING TRAINING APPARATUS AND METHODS OF TRAINING

CROSS-REFERENCES TO RELATED APPLICATIONS

The present application claims the benefit of and priority to U.S. Provisional Application No. 63/416,356, filed Oct. 14, 2022, entitled "EYE-IMAGING TRAINING APPARATUS AND METHODS OF TRAINING," the entire contents of which is incorporated herein by reference for all intents and purposes.

BACKGROUND OF THE INVENTION

Eye-imaging devices are used to detect potential eye diseases, vision impairments, and indicators of various other diseases. Eye diseases and vision problems among children, especially infants, can have severe and far-reaching implications. Undetected eye problems in infants and others may result in irreversible loss of vision. Early detection and diagnosis provide the best opportunity for treatment and prevention of vision loss.

Despite the progress made in eye-imaging devices, there is a need in the art for improved methods and systems related to imaging of the eye.

SUMMARY OF THE INVENTION

The present disclosure relates to an eye-imaging training apparatus, a system, and a method for training using an eye-imaging training apparatus. In particular, the present disclosure provides an eye-imaging training apparatus that provides a simulation for caregivers to learn various practices (e.g., retracting eyelids, calibrating and using eye-imaging cameras, etc.) that provides training to a caregiver, avoids harm to patients, and improves efficiency. Beneficially, the eye-imaging training apparatus can train caregivers to learn to properly align eye-imaging cameras and to practice imaging a moveable eyeball having numerous functionalities.

Embodiments of the present disclosure include an eye-imaging training apparatus. The eye-imaging training apparatus includes a housing including a front end and a rear end. The front end may be removably attached to the rear end to provide an interior volume of the housing. The apparatus also includes a first eye socket and a second eye socket formed on the front end of the housing. The apparatus also includes an eye structure disposed in each of the first eye socket and the second eye socket. The eye structure may include an eyeball member and a fastening member, where the fastening member extends from a distal end of the eyeball member. The apparatus also includes an actuator assembly disposed in the interior volume of the housing. The actuator assembly may include a pivot member and a receiving member in communication with the pivot member. The receiving member may be configured to receive the fastening member of the eyeball structure. The pivot member is configured to move the eyeball member within at least one of the first eye socket and the second eye socket. The apparatus also includes a base material disposed over at least the front end of the housing.

Embodiments of the present disclosure include a system of training a caregiver to perform eye imaging. The system of training includes providing an eye-imaging training apparatus. The eye-imaging training apparatus includes a housing including a front end and a rear end. The front end may be removably attached to the rear end to provide an interior volume of the housing. The apparatus also includes a first eye socket and a second eye socket formed on the front end of the housing. The apparatus also includes an eye structure disposed in each of the first eye socket and the second eye socket. The eye structure may include an eyeball member and a fastening member, where the fastening member extends from a distal end of the eyeball member. The apparatus also includes an actuator assembly disposed in the interior volume of the housing. The actuator assembly may include a pivot member and a receiving member in communication with the pivot member. The receiving member may be configured to receive the fastening member of the eyeball structure. The pivot member is configured to move the eyeball member within at least one of the first eye socket and the second eye socket. The apparatus also includes a base material disposed over at least the front end of the housing. The base material may include a pair of retractable eyelids configured to rest over the eyeball member disposed in the first eye socket and the second eye socket. The system may also include one or more speculum configured to retract the retractable eyelids.

Embodiments of the present disclosure include a method of training a caregiver to use an eye-imaging camera. The method includes providing an eye-imaging training apparatus. The eye-imaging training apparatus includes a housing including a front end and a rear end. The front end may be removably attached to the rear end to provide an interior volume of the housing. The apparatus also includes a first eye socket and a second eye socket formed on the front end of the housing. The apparatus also includes an eye structure disposed in each of the first eye socket and the second eye socket. The eye structure may include an eyeball member and a fastening member, where the fastening member extends from a distal end of the eyeball member. The apparatus also includes an actuator assembly disposed in the interior volume of the housing. The actuator assembly may include a pivot member and a receiving member in communication with the pivot member. The receiving member may be configured to receive the fastening member of the eyeball structure. The pivot member is configured to move the eyeball member within at least one of the first eye socket and the second eye socket. The apparatus also includes a base material disposed over at least the front end of the housing. The base material may include a pair of retractable eyelids configured to rest over the eyeball member disposed in the first eye socket and the second eye socket. The method also includes securing the eye-imaging training apparatus on a surface. The method also includes retracting one or more of the retractable eyelids. The method also includes providing an eye-imaging camera for imaging the eyeball member. The method also includes exerting an external force on the actuator assembly to move the eyeball member within at least one of the first eye socket and the second eye socket. The method also includes tracking the eyeball member in the first eye socket and the second eye socket with the eye-imaging camera. The method also includes aligning the eye-imaging camera with the eyeball member in the first eye socket and the second eye socket. The method also includes imaging the eyeball member.

Numerous benefits are achieved by way of the present disclosure over conventional techniques. For example, embodiments of the present disclosure provide an eye-imaging training apparatus that allows caregivers to train in a simulated experience. The eye-imaging training apparatus provides training and experience to be able to properly retract eyelids, calibrate and use eye-imaging cameras, and track the eyeball for eye imaging. The eye-imaging training apparatus provides a training tool that can help caregivers learn best practices for eye imaging. This can avoid potential injury to patients and can improve results from eye imaging tests that can lead to more accurate diagnosis. These and other embodiments of the disclosure, along with many of their advantages and features, are described in more detail in conjunction with the text below and attached figures.

DETAILED DESCRIPTION OF SPECIFIC EMBODIMENTS

Figure 1:
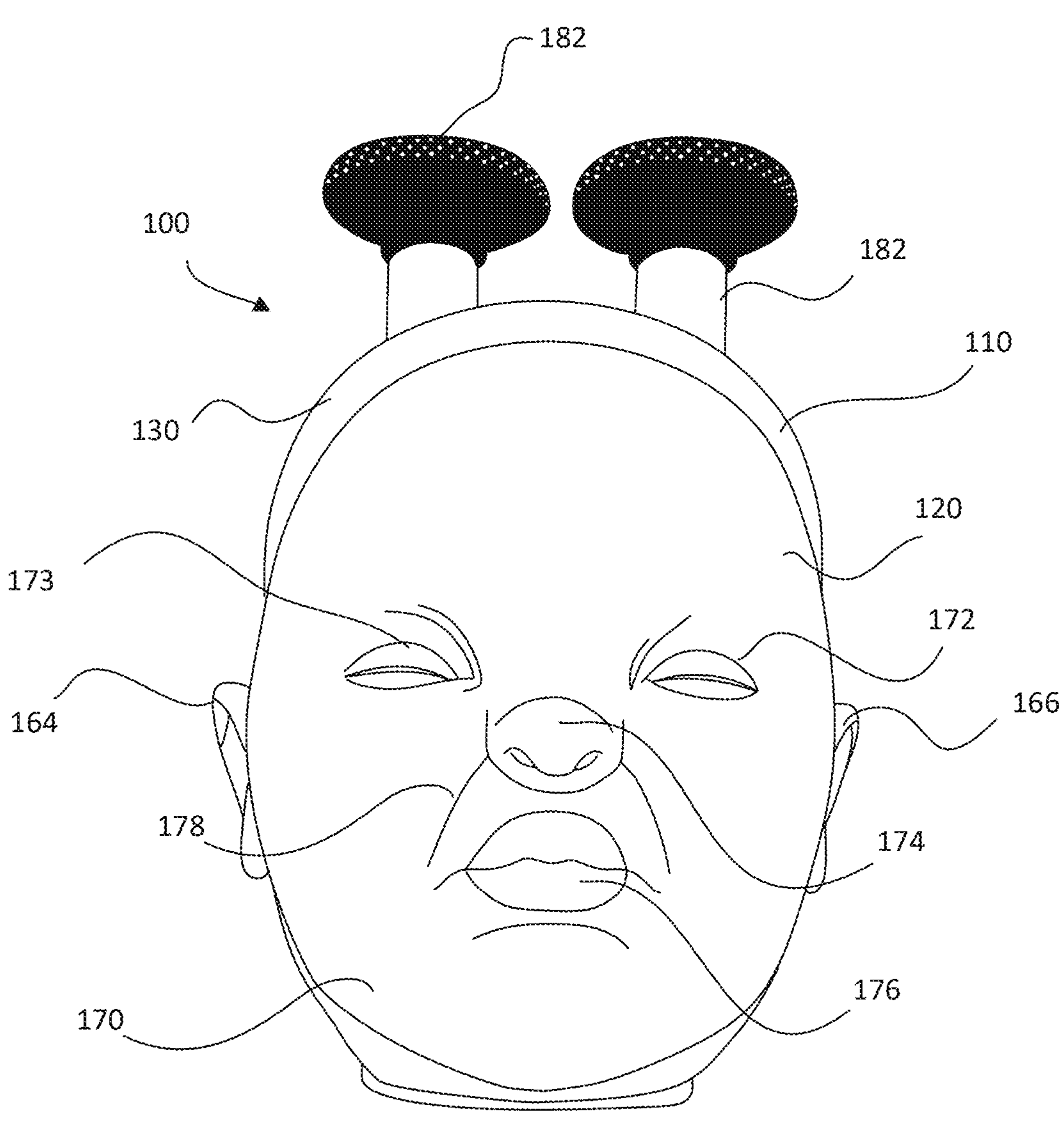
FIG. 1 illustrates a front perspective view of an eye-imaging training apparatus according to some embodiments.

The inventors have determined that imaging the eyes of patients, and particularly children and infants, is a very delicate and regimented process. This process demands adequate training and experience to be able to properly retract eyelids, calibrate and use various eye-imaging cameras, track the eyeball for eye-imaging, among other things. Yet, there is a severe lack of training tools that can help caregivers learn best practices for eye imaging. This can lead to potential injury to patients and inaccurate results from eye imaging tests that can lead to potential misdiagnosis.

Therefore, devices and methods are needed for training caregivers that simulate or mimic natural and human-like eye movement for training purposes. Additionally, there is a need for an eye-imaging training apparatus for training caregivers to obtain high quality images of the eye using effective techniques.

The present disclosure describes a number of embodiments related to an apparatus, system, and method for training caregivers to use equipment for any eye imaging modality. For example, the training apparatus can be used to train caregivers for ophthalmic imaging such as confocal scanning laser ophthalmoscopy, optical coherence tomography, scanning laser polarimetry, and fluorescein angiography. In some embodiments, the present disclosure provides an eye-imaging training apparatus including an actuator to articulate one or more movable members (e.g., eyeball members). In some embodiments, the eye-imaging training apparatus provides a caregiver a training tool for practicing various eye-imaging techniques that simulate or mimic natural and animal-like eye movement. For example, the eye-imaging training apparatus may include an eyeball member that can move in multiple directions to simulate human-like eye movement. The eye-imaging training apparatus can train a caregiver to practice, for example, aligning an eye-imaging camera, calibrating the eye-imaging camera (e.g., determining the desired optical parameters), and retracting eyelids for eye-imaging. The present disclosure is also related to systems and methods for eye imaging using the eye-imaging training apparatus described herein.

As described above, the eye-imaging training apparatus described herein can provide a real-life model to practice various eye-imaging techniques. In some embodiments, the eye-imaging training apparatus may include a housing resembling and having the shape of an animal (e.g., baby head). For example, the housing may include eye sockets for receiving an eye, a nose, a mouth, ear sockets for receiving ears. The eye-imaging training apparatus may include a base material that corresponds to the texture of skin that is disposed on a portion of the housing. In some embodiments, the base material adheres to a surface of the housing (e.g., the front face). The base material may include eyelids that are configured to fit over the eye sockets of the housing, a nose that is configured to fit over the nose region of the housing, and a mouth that is configured to fit over the nose region of the housing. The base material may include contoured features around the eyes, nose, mouth, other regions to provide a real-life appearance. In some embodiments, the base material is a silicone-based material.

In some embodiments, the housing may include one or more eye sockets configured to receive removable eye structures. The eye structures can be inserted into the eye sockets and coupled to an actuator assembly. For example, the eye structures may include a fastening member (e.g., an elongated pin) on a rear face of an eyeball member that can be coupled to an actuator assembly. The actuator assembly includes a first receiving member and a second receiving member. The first receiving member and the second receiving member are configured to receive the fastening members of the eye structures. The first receiving member and the second receiving member are each coupled to a mechanical actuator (e.g., levers or knobs) of the actuator assembly. In some embodiments, the mechanical actuator is configured to move the eyeball members in a desired XYZ direction in the eye sockets. For example, the mechanical actuator can be an ear structure that is coupled to one of the receiving members that is capable of being rotated or pushed to move the eye structures in a desired direction. In this way, a trainer can move the eye structures in the eye socket of the housing to mimic the movement of the eyes of an animal and a caregiver can practice aligning and imaging using an eye-imaging device. Additionally, a caregiver can practice using devices (e.g., a speculum) to retract the eyelids of the eye-imaging training apparatus.

The present disclosure also relates to an eye-imaging training apparatus including one or more eye structures that have multiple functionalities. For example, the eye structure may include an eyeball member including an electrically conductive substrate and one or more sensors to detect light. Based on the detected light from the sensors, a processor can send an electrical signal to an electrical pulse generator to provide an electrical pulse to the electrically conductive substrate. In some embodiments, the electrical pulse can correspond to electrical responses of the retina in response to light.

In some embodiments, the eye-imaging training apparatus may include a microfluidic network to deliver fluids to one or more regions of the eye-imaging training apparatus. In some embodiments, the eye structures of the eye-imaging training apparatus may include a plurality of channels of the microfluidic network. For example, the eyeball members of the eye structure can include channels that mimic the veins in an animal eye (e.g., animal eye). The microfluidic network may include a pump (e.g., a peristaltic pump) that pumps fluid throughout the eyeballs and to, for example, the pupils. The fluid can be a fluorescent dye (e.g., fluroxene). The eye-imaging training apparatus can include an inject port to supply a fluid to the microfluidic network.

Figure 2:
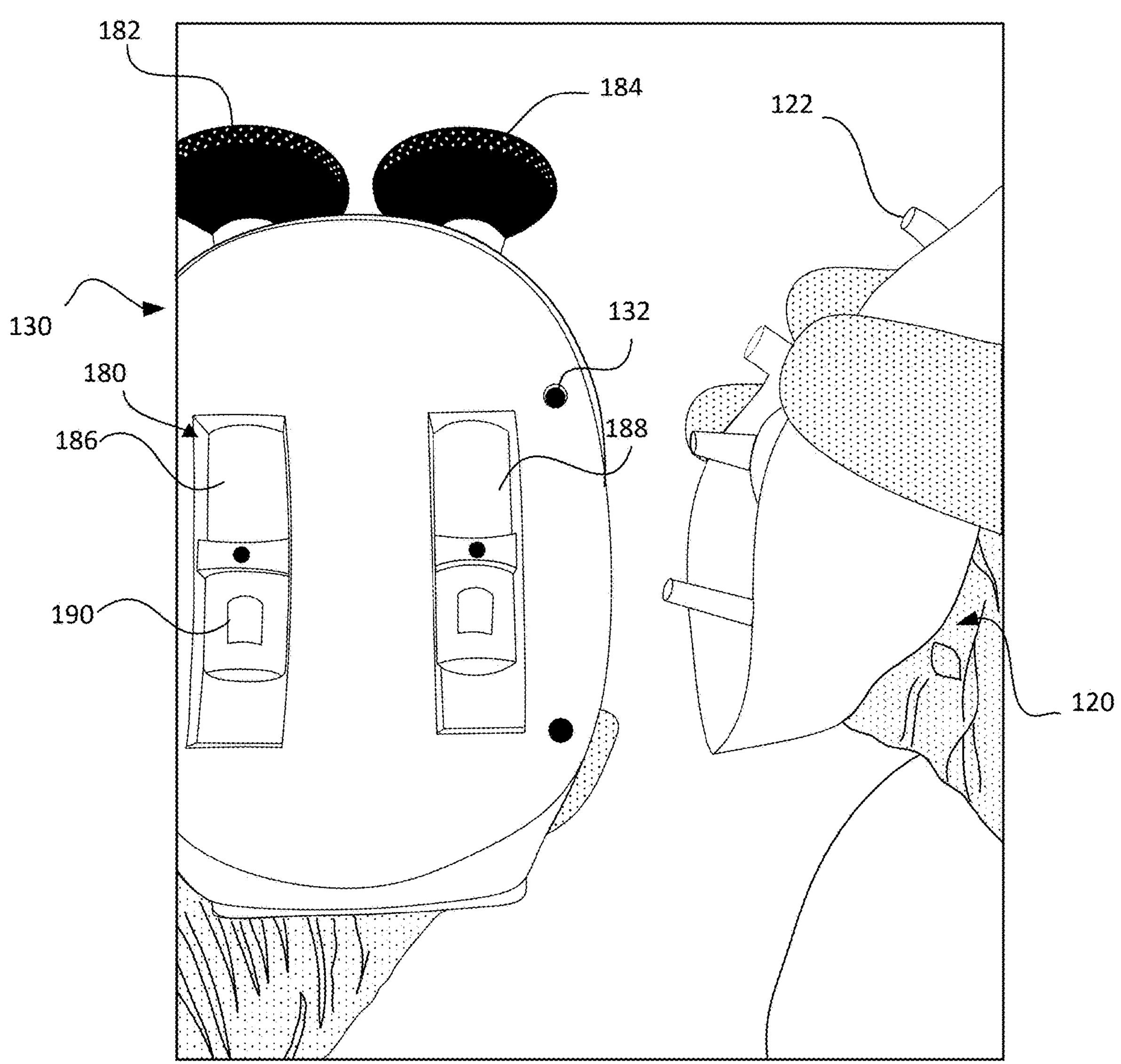
FIG. 2 illustrates the internal structure of the housing of the eye-imaging training apparatus according to some embodiments.

FIG. 1 illustrates a front perspective view of an eye-imaging training apparatus according to some embodiments. The eye-imaging training apparatus 100 comprises a housing 110. The housing 110 includes a front end 120 and a rear end 130. In some embodiments, the front end 120 and the rear end 130 of the housing are removably attached. As shown in FIG. 2, the front end 120 includes a male engagement member 122 and the rear end 130 includes a female engagement member 132. The female engagement member 132 disposed on the rear end 130 is configured to receive the male engagement member 122 of the front end 120. The front end 120 and the rear end 130 can be removably attached by any suitable means to allow for access to the interior volume of the housing 110.

The housing 110 can resemble and have a shape that corresponds to an animal. For example, the housing 110 can have the shape of a baby head and include features to resemble a baby's face. In this embodiment, the front end 120 of the housing 110 includes a base material 170 disposed over the front end 120 of the housing 110. The base material 170 includes features that resemble the features of a baby's face. For example, the base material 170 includes a first eyelid 172, a second eyelid 173, a nose 174, a mouth 176, and a plurality of contour features 178. In some embodiments, the contour features 178 correspond to creases between the mouth and nose, creases between the nose and eyes, and creases around the eyes to provide a real-life simulation of a baby face. The rear end 130 of the housing 110 may include a first ear 164 and a second ear 166 on each opposing side of the housing 110.

Figure 3:
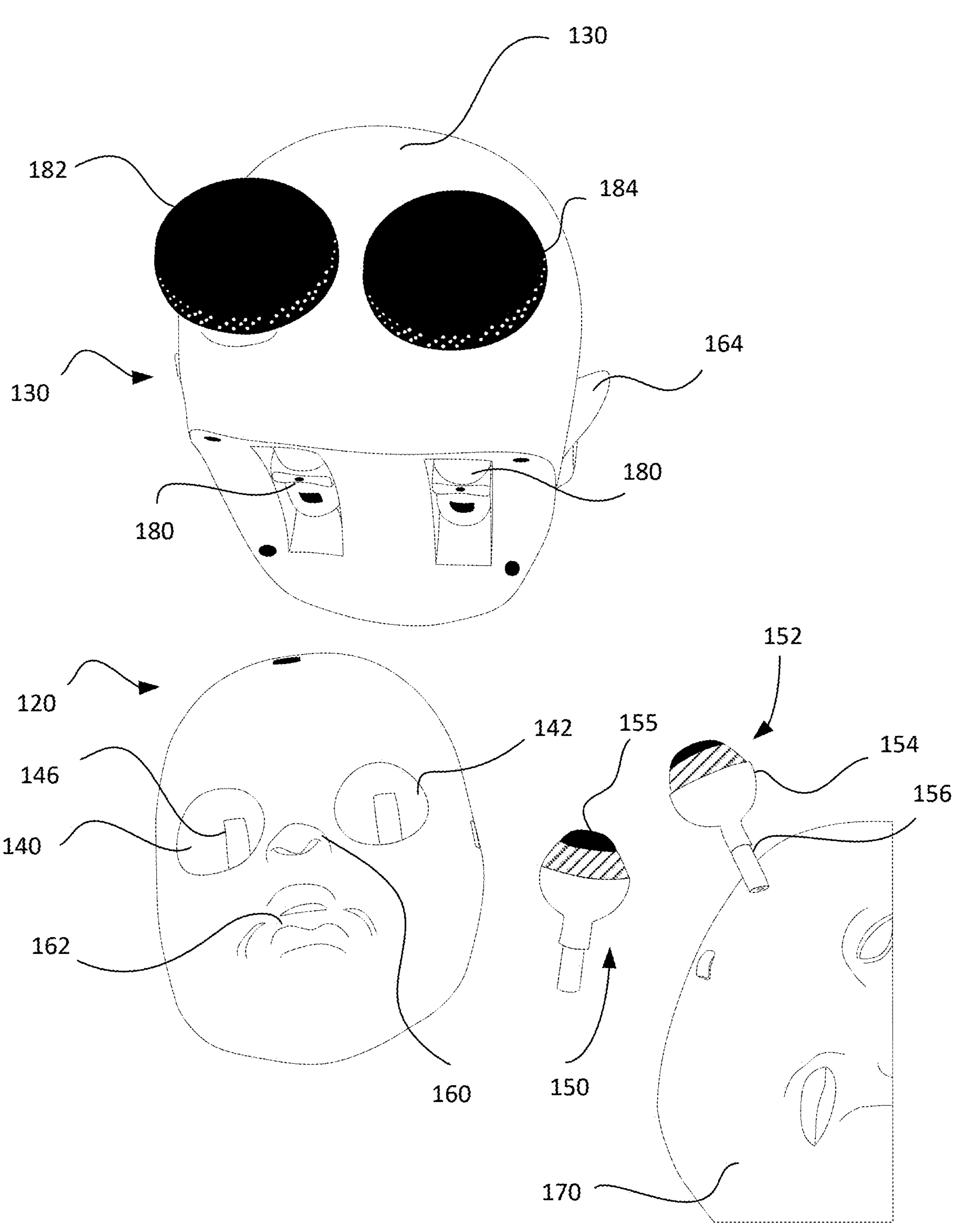
FIG. 3 illustrates a dissembled eye-imaging training apparatus according to some embodiments.

FIG. 3 shows illustrates a dissembled view of the eye-imaging training apparatus 100 according to some embodiments. As shown in FIG. 3, the front end 120 of the housing 110 is detached from the rear end 130 and the base material 170 is removed from the front end 120. In this embodiment, the front end 120 of the housing 110 includes a first eye socket 140 and a second eye socket 142 configured to receive a first eye structure 150 and a second eye structure 152. The first eye socket 140 and the second eye socket 142 each comprise a concave receptacle to receive the first eye structure 150 and the second eye structure 152, respectively. The first eye socket 140 and a second eye socket 142 each include an aperture 146. The aperture 146 in each of the first eye socket 140 and the second eye socket 142 provides an access point to the interior volume of the housing 110. In some embodiments, the front end 120 of the housing 110 may include a nose region 160 and a mouth region 162, and the rear end 130 of the housing may include a first ear 164 and a second ear 166. In this way, the housing resembles the appearance of a baby.

The eye-imaging training apparatus 100 includes a first eye structure 150 and a second eye structure 152. The first eye structure 150 includes a first eyeball member 154 and the second eye structure 152 includes a second eyeball member 155 and a fastening member 156. In some embodiments, each of the eyeball members may resemble a human eye. For example, each of the each of the eyeball members may include portions resembling the sclera, the iris, the pupil, the cornea, the retina, the lens, optic nerves, and various blood vessels. In some embodiments, the blood vessels can be channels of a microfluidic network that is configured to carry a fluid. The fastening member 156 extends from the distal end of the first eyeball member 154. The fastening member 156 can be an elongated pin that is configured to extend through the aperture 146 of the sockets and can be coupled to an actuator assembly.

As shown in FIG. 1, the eye-imaging training apparatus 100 may include a base material 170 that is disposed on the front end 120 of the housing 110. In some embodiments, the base material 170 adheres to a surface of the housing. For example, the base material 170 may comprise a non-slip material that can adhere to the housing 110 via surface tension forces. The base material may include a first eyelid 172 and a second eyelid 173 that are configured to fit over the eyeball members of the first eye structure 150 and the second eye structure 152. The first eyelid 172 and the second eyelid 173 are configured to partially or completely cover the eyeball members. In this way, a caregiver can train using speculum to retract the eyelids of the base material 170 disposed on the eye-imaging training apparatus 100.

Figure 4:
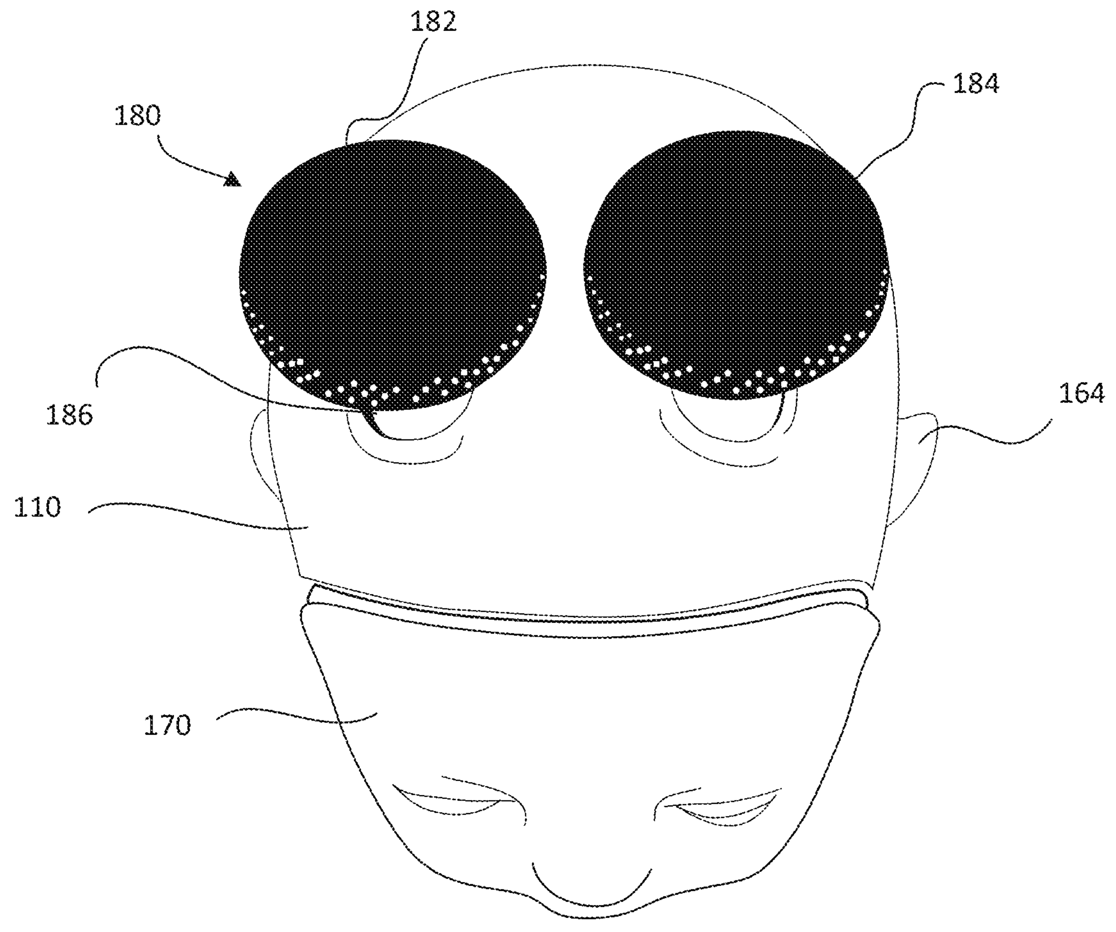
FIG. 4 illustrates a top perspective view of an eye-imaging training apparatus according to some embodiments.

The base material 170 has a profile that corresponds to the front end 120 of the housing 110. For example, the base material 170 includes a first eyelid 172 and a second eyelid 173 configured to rest over the eyeball members, a nose 174 that is configured to fit over the nose region of the housing 110, and a mouth 176 that is configured to fit over the mouth region of the housing 110. The base material 170 may include contour features 178 around the eyes, nose, mouth, other regions to provide a real-life appearance. In some embodiments, the base material is a silicone-based material. In some embodiments, the base material can be disposed over the entire surface of the housing 110. In some embodiments, the base material can have a color resembling human skin. For example, FIG. 2 illustrates the internal structure of the housing of the eye-imaging training apparatus according to some embodiments. The eye-imaging training apparatus 100 may include an actuator assembly 180 that is configured to engage (e.g., move) the first eye structure 150 and the second eye structure 152. For example, a force can be exerted on the actuator assembly 180 to manipulate the first eye structure 150 and the second eye structure 152. This action can force the eyeball members of the first eye structure 150 and the second eye structure 152 to move in any direction within the eye socket of the housing 110. As shown in FIG. 4, the actuator assembly 180 includes a first knob 182 and a second knob 184 disposed outside the housing 110. The first knob 182 may be coupled to a first arm 186 and the second knob 184 may be coupled to a second arm 188. Each of the first arm 186 and the second arm 188 extend from the knobs to the interior of the housing 110. The first arm 186 and the second arm 188 each include a receiving member 190. The receiving member 190 is configured to receive the fastening member 156 of the eyeball structures. In this way, a force can be exerted on the first knob 182 to move the first eye structure 150 and the second knob 184 to move the second eye structure 152. The first eye structure 150 and the second eye structure 152 are configured to move along an X-axis, a Y-axis, and/or a Z-axis, with respect to a long axis of the eye-imaging training apparatus, based on the exerted force. For example, the first knob 182 and the second knob 184 can be rotated in any direction to translate the eyeball member along the X-axis. The first knob 182 and the second knob 184 can be pulled or pushed to translate the eyeball member along the Y-axis.

Figure 5:
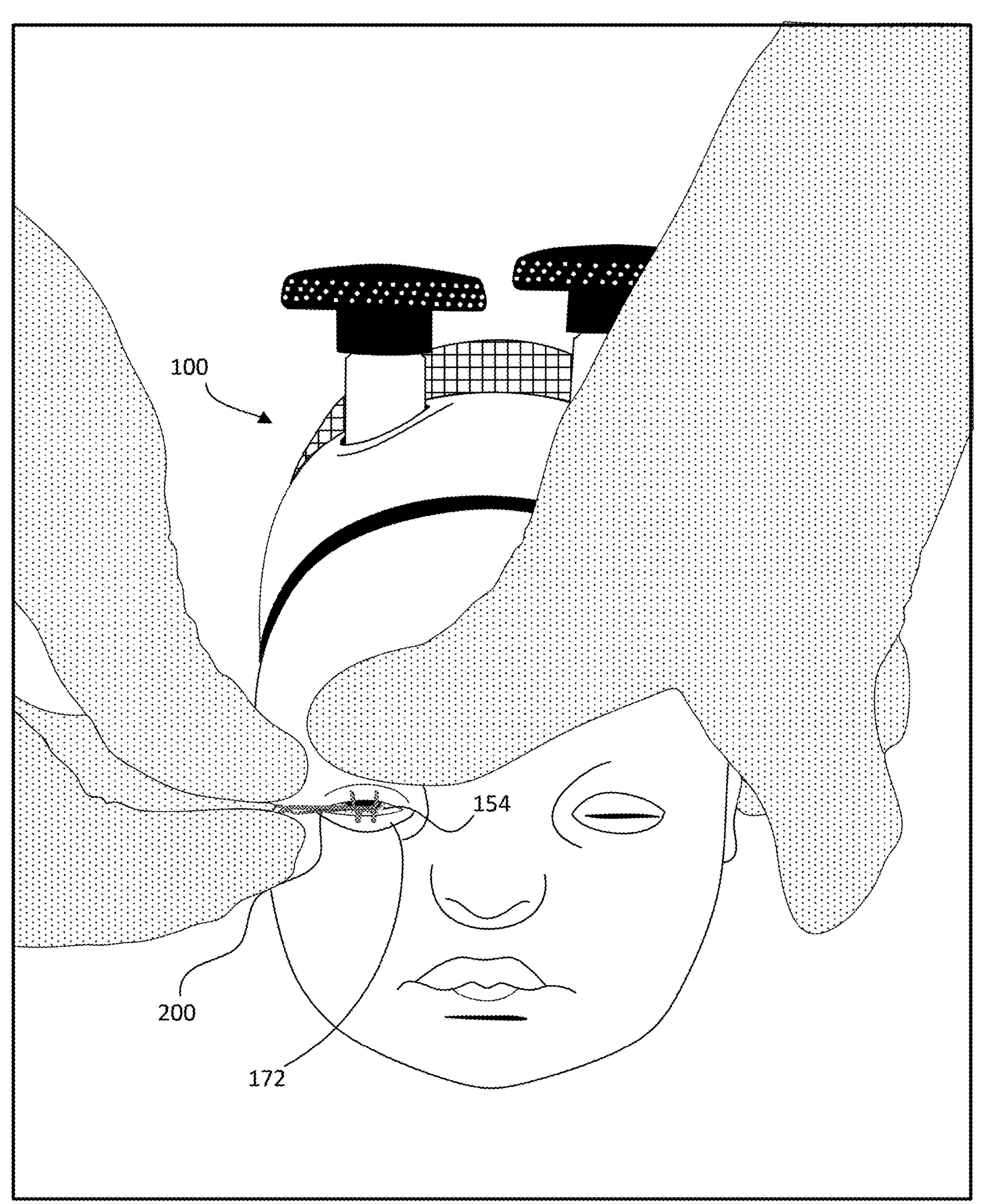
FIG. 5 illustrates a caregiver opening an eyelid of the eye-imaging training apparatus with a speculum according to some embodiments.

FIGS. 5-9 illustrate the eye-imaging training apparatus described in FIGS. 1-4 in use for training a caregiver. The eye-imaging training apparatus 100 can be placed on a surface. In some embodiments, the eye-imaging training apparatus 100 is placed on a flat surface. In some embodiments, the eye-imaging training apparatus 100 can be secured on a surface. For example, the eye-imaging training apparatus 100 can be secured to a table using fasteners or a person can hold the eye-imaging training apparatus 100 in place. As shown in FIG. 5, a caregiver can use a first speculum 200 to retract the first eyelid 172 covering the first eyeball member 154. The caregiver can practice using the first speculum 200 to retract the bottom portion of the first eyelid 172 and the top portion of the first eyelid 172 using the first speculum 200.

Figure 6:
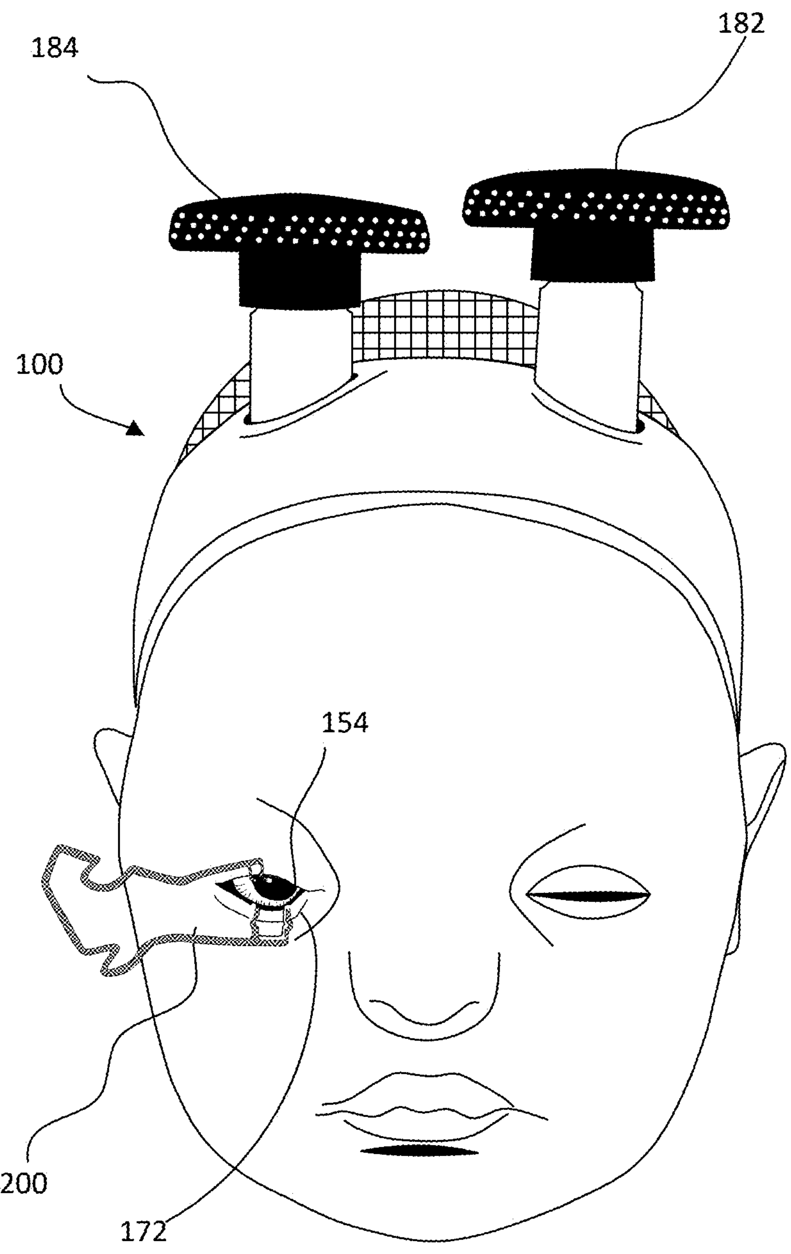
FIG. 6 illustrates the speculum holding the eyelid of the eye-imaging training apparatus in an open position according to some embodiments
Figure 7:
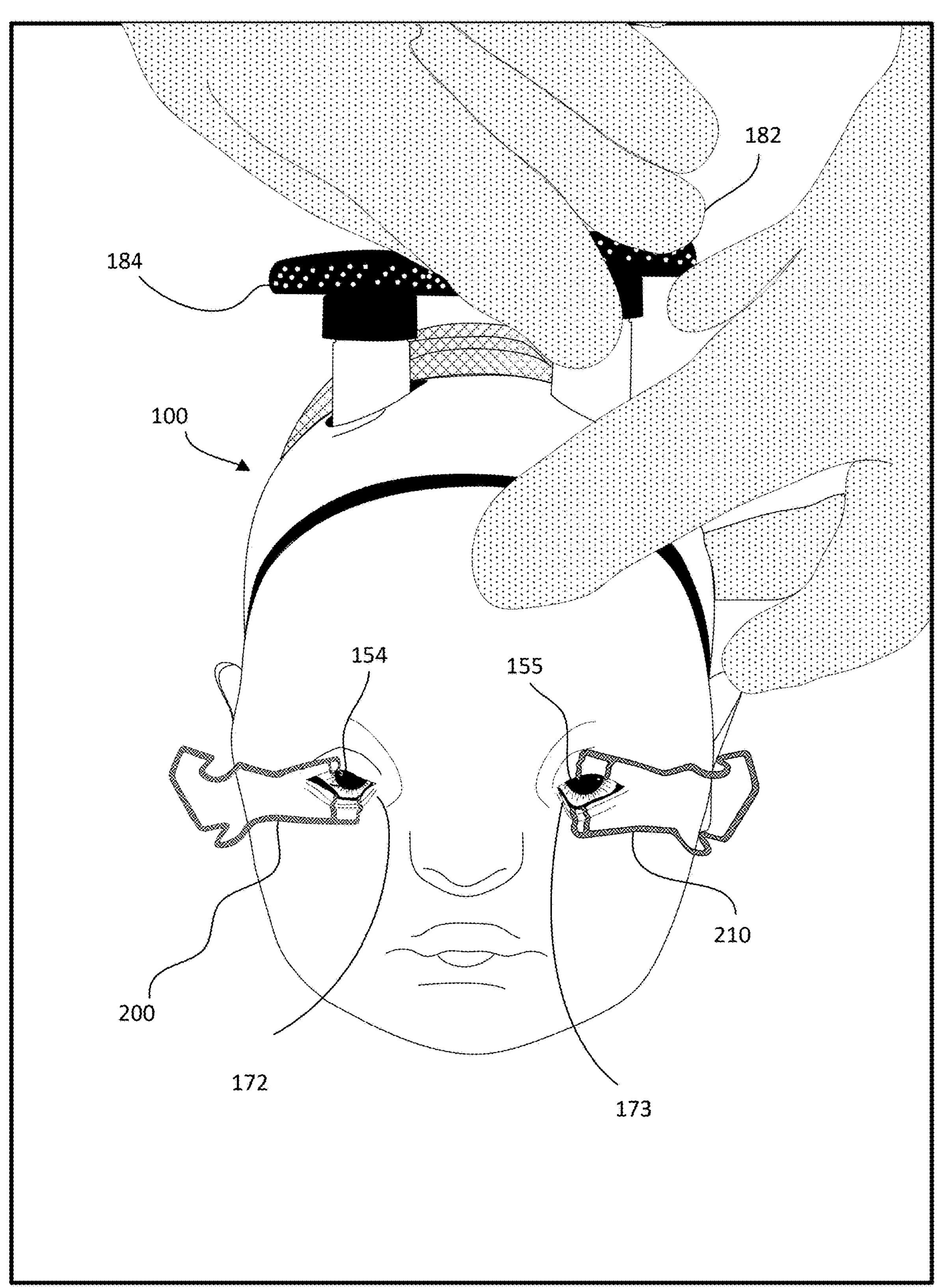
FIG. 7 illustrates a pair of speculum holding the eyelids of the eye-imaging training apparatus in an open position according to some embodiments.

FIG. 6 illustrates a first speculum 200 holding the top and bottom portions of the first eyelid 172 covering the first eyeball member 154 of the eye-imaging training apparatus 100 in an open position. After the first speculum 200 is used to retract the first eyelid 172 covering the first eyeball member 154, a second speculum 210 can be used to retract the second eyelid 173 covering the second eyeball member 155. As shown in FIG. 7, a second speculum 210 can retract the second eyelid 173 covering the second eyeball member 155.

Figure 8:
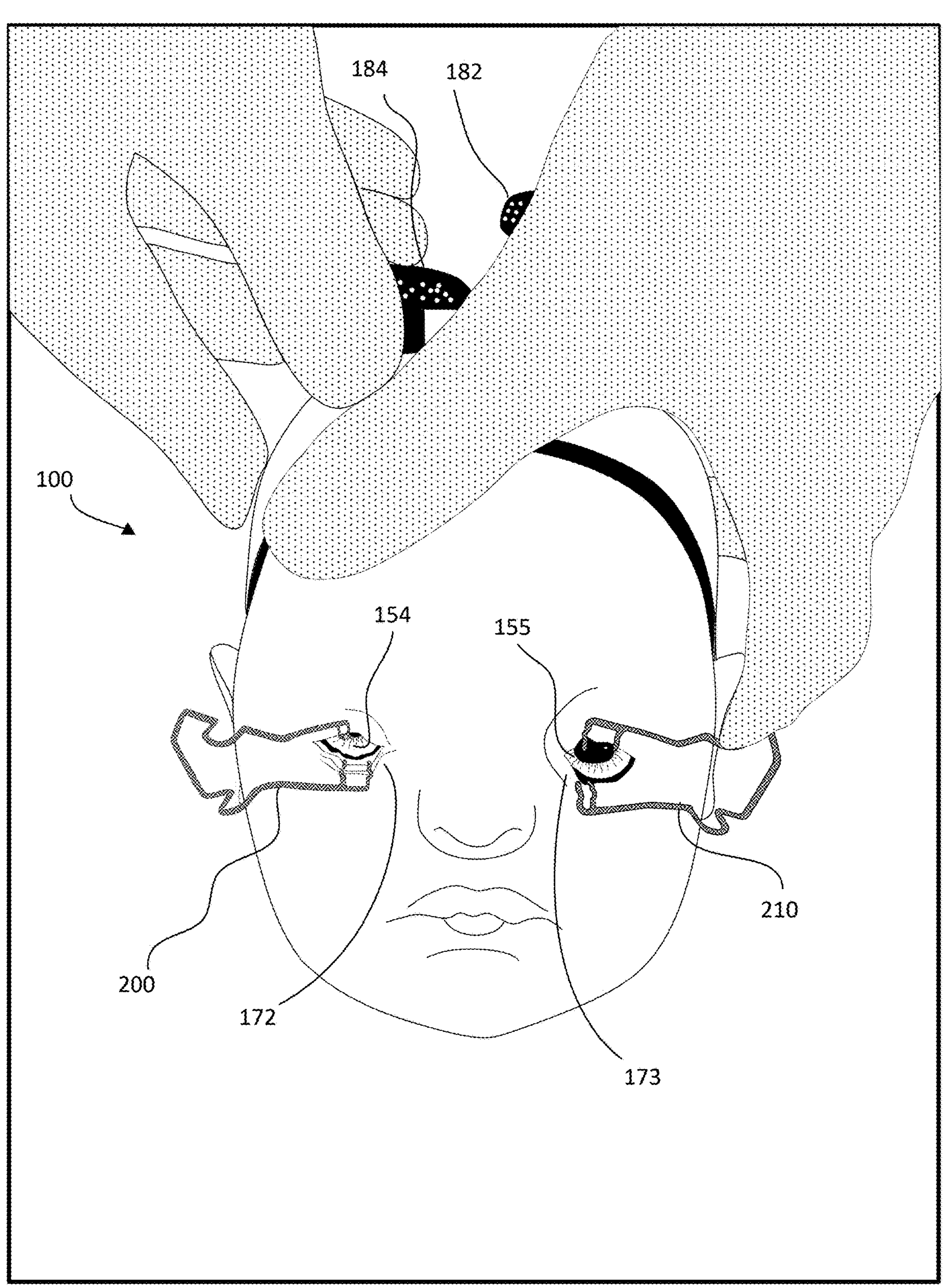
FIG. 8 illustrates a caregiver actuating an assembly of the housing to move the eyeball members in the socket of the eye-imaging training apparatus according to some embodiments.

FIGS. 7 and 8 illustrate a trainer exerting an external force on the first knob 182 and the second knob 184 of the actuator assembly, respectively, to move the eyeball members. As shown in the FIG. 7, the first speculum 200 and the second speculum 210 each hold first eyelid 172 and the second eyelid 173 in an open position. In this configuration, a caregiver can view of each of the eyeball members of the first eye structure 150 and the second eye structure 152. In this position, an individual (e.g., an instructor) can actuate the first knob 182 or second knob 184 to move the eyeball member within the eye socket of the eye-imaging training apparatus. For example, actuating the first knob 182 can move the eyeball member of the first eye structure 150 and actuating the second knob 184 can move the eyeball member of the second eye structure 152. FIG. 7 shows the first knob 182 being manipulated to move the eyeball member of the first eye structure 150. Similarly, FIG. 8 shows the second knob 184 can be manipulated to move the eyeball member of the second eye structure 152. As the eyeball members move within the eye socket, a caregiver can practice tracking the eyeball members of the first eye structure 150 and the second eye structure 152 with an eye-imaging camera and aligning the eye-imaging camera with a desired target in the first eye structure 150 and the second eye structure 152. The caregiver can then practice imaging the first eye structure 150 and the second eye structure 152 once the eye-imaging camera is aligned with the desired location of the first eye structure 150 and the second eye structure 152.

Figure 9:
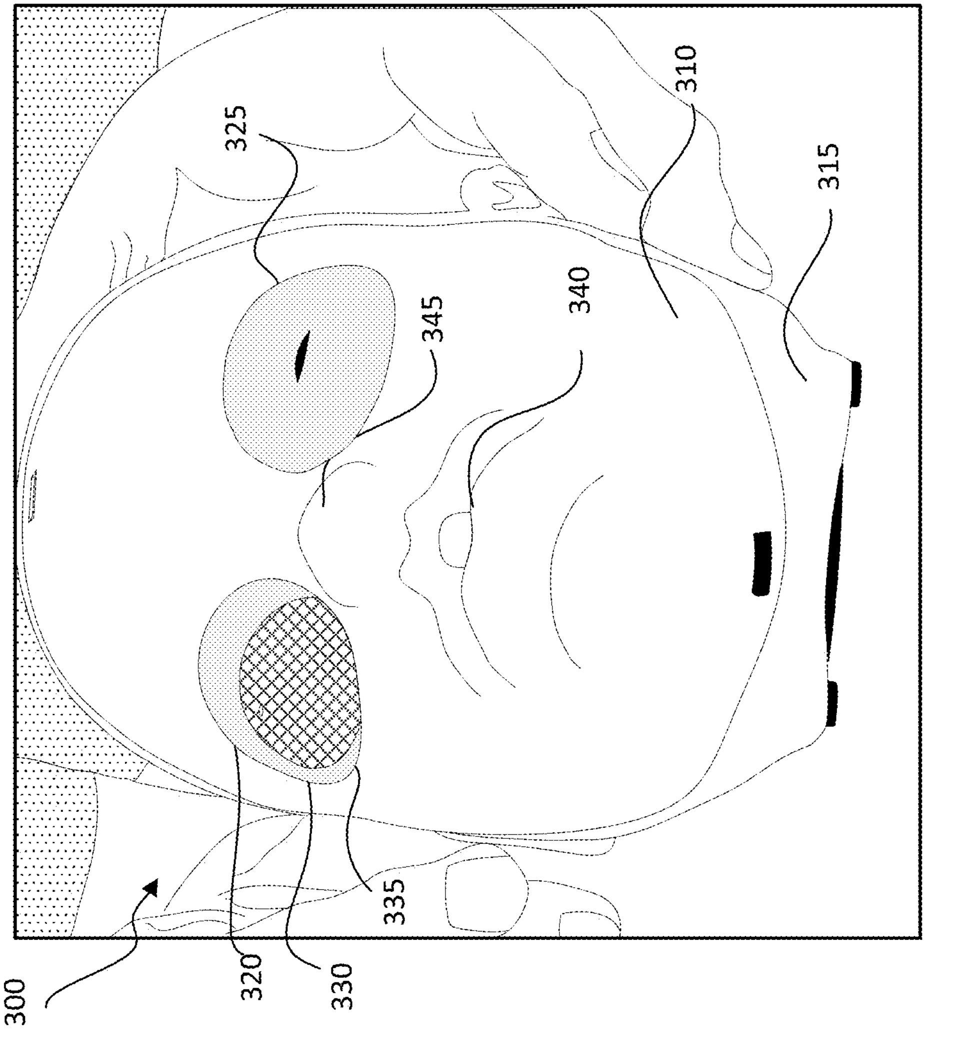
FIG. 9 illustrates a perspective view of another eye-imaging training apparatus according to some embodiments.
Figure 10:
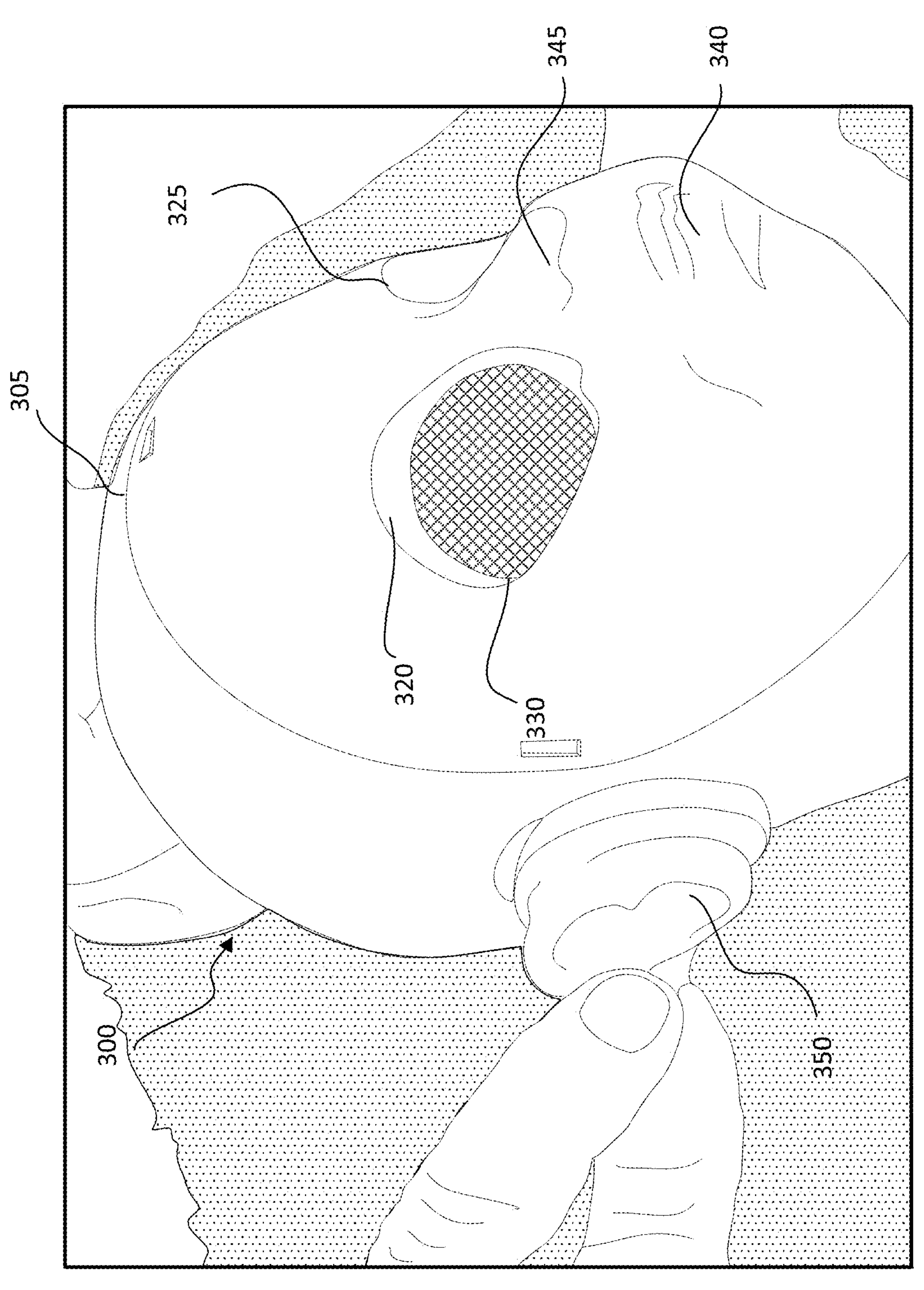
FIG. 10 illustrates a side-perspective view of the eye-imaging training apparatus of FIG. 9 according to some embodiments.

FIGS. 9 and 10 illustrate perspective and side-perspective views, respectively, of another eye-imaging training apparatus. The eye-imaging training apparatus 300 may include a housing 305 including a first part 310 and a second part 315. The first part 310 can be removably attached to the second part 315. The first part 310 and the second part 315 are removably attached to provide access to the interior volume of the housing 305. The first part 310 of the housing 305 includes a first eye socket 320 and a second eye socket 325 configured to receive an eye structure 330. The first eye socket 320 and the second eye socket 325 each comprise a concave receptacle 335 to receive an eye structure 330. The first part 310 may include a mouth region 340 and a nose region 345. The second part 315 of the housing 305 includes a pair of ear structures 350 on opposing sides of the housing 305. The housing 305 can resemble and have a shape that corresponds to a baby's face.

In some embodiments, the eye-imaging training apparatus 300 includes a base material. The base material may comprise a silicone-based material. The silicone-based material may have a skin-like texture. The base material may include eyelids, a mouth, and a nose that corresponds to the first eye socket 320, the second eye socket 325, the mouth region 340, and the nose region 345 of the housing 305.

Figure 11:
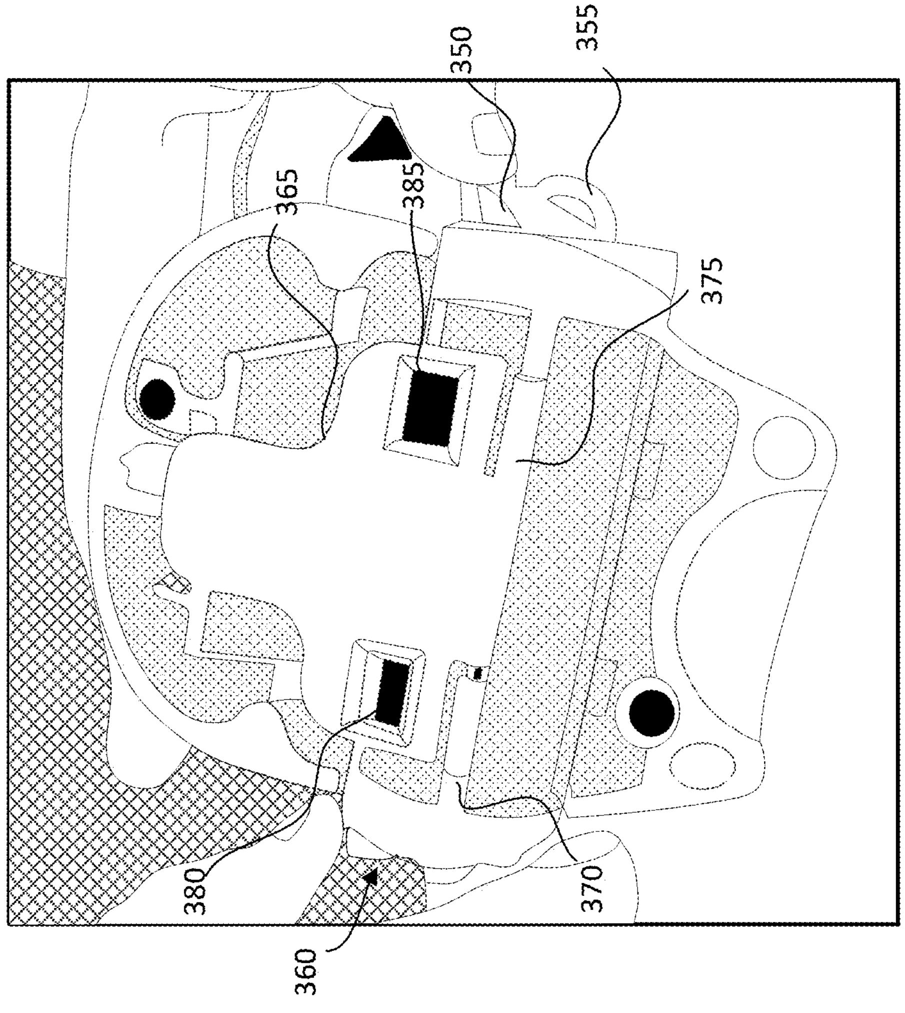
FIG. 11 illustrates an internal view of the actuation assembly of the eye-imaging training apparatus of FIG. 10 according to some embodiments.
Figure 11:
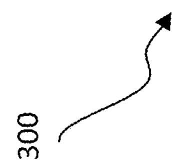

FIG. 11 illustrates the interior volume of the housing 305 including an actuator assembly 360. The actuator assembly 360 includes a top region 365 and a bottom region 370. The top region 365 can be connected to the bottom region 370 via a connection member. For example, the top region 365 can be connected to the bottom region 370 via a hinge 375. The top region 365 includes a first receiving member 380 and a second receiving member 385. The first receiving member 380 and the second receiving member 385 are configured to receive a fastening member (e.g., a pin) from an eyeball structure. In this way, the eyeball structure can be coupled to the actuator assembly 360.

Figure 12:
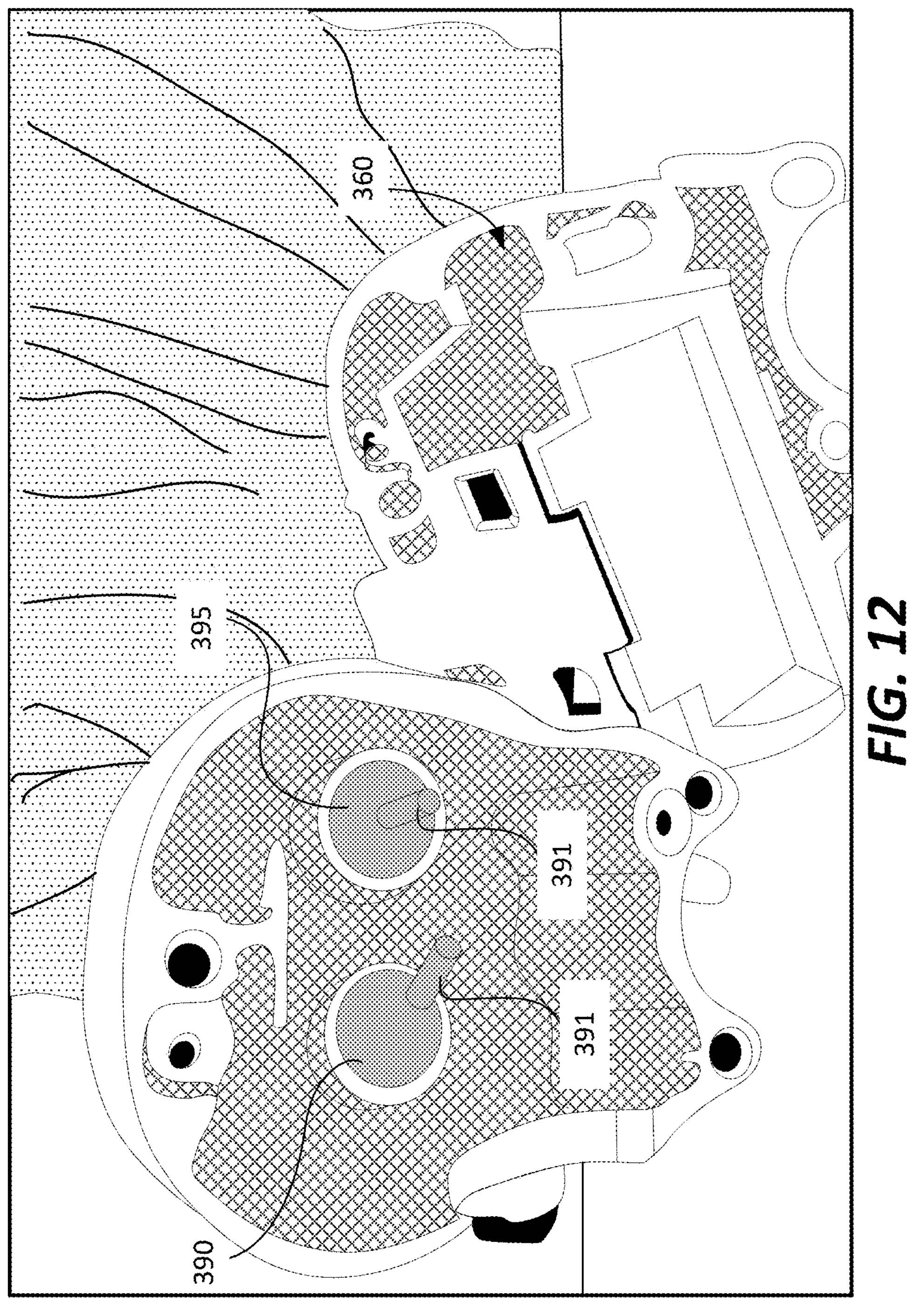
FIG. 12 illustrates the front and rear parts of the eye-imaging training apparatus of FIG. 10 according to some embodiments.

In some embodiments, the bottom region 370 can be a unitary structure. The bottom region 370 region can include a first end and a second end. The first end and the second end may include ear structures 350. The ear structures 350 may include gripping member 355. The gripping member 355 can be used to manipulate the ear structures 350 to translate the eyeball members in the socket. For example, FIG. 12 shows a first eyeball structure 390 and a second eyeball structure 395. Each of the first eyeball structure 390 and the second eyeball structure 395 includes a fastening member 391. The fastening member 391 extends from the distal end of the eyeball member. The fastening member 391 can be an elongated pin that is configured to be coupled to the first receiving member 380 and the second receiving member 385 of the top region 365 of the actuator assembly 360. In some embodiments, actuating ear structures 350 acts on the fastening member 391 coupled to the receiving member to translate the eyeball members along an X-axis, a Y-axis, or a Z-axis, with respect to a long axis of the eye-imaging training apparatus. In some embodiments, a sensor could be disposed in the mouth of the model to detect dextrose or other suitable chemical. If a pacifier coated with dextrose is inserted in the mouth of the model, the sensor would detect the dextrose and cause the eyes to stop rotating. This would simulate the clinical practice of giving a neonate patient a pacifier dipped in dextrose to calm them and get the neonate to focus forward and stop rolling their eyes.

Figure 13:
FIG. 13 illustrate another eye-imaging training apparatus including a funnel cone eye structure according to some embodiments.

FIG. 13 provides another exemplary eye-imaging training apparatus. As discussed herein, the appearance and shape of the eye-imaging training apparatus can simulate a real-life animal. For example, FIG. 13 shows an eye-imaging training apparatus 400 in the shape of and resembling a mouse. In some embodiments, a three-dimensional scan of an animal can be used to produce the eye-imaging training apparatus 400. For example, the eye-imaging training apparatus 400 can be created based on a magnetic resonance imaging (MRI) scan of a mouse to produce a real-life eye-imaging training apparatus. In some embodiments, the scan can provide the basis for a 3D-printed eye-imaging training apparatus. The eye-imaging training apparatus 400 may include a pair of eyeball structures 410. Each of the eyeball structures 410 may include a conical structure including an aperture 420 at a center region. The eye-imaging training apparatus 400 is useful for training caregivers to align an eye-imaging camera with the eyeball structure 410. For example, the eye-imaging training apparatus 400 can be used to train a caregiver to align the eye-imaging camera to sight down the aperture of the eyeball structure 410. The eyeball structure 410 can provide negative feedback if the eye-imaging camera is aligned with a side wall of the eyeball structure 410 rather than the aperture 420.

Figure 14:
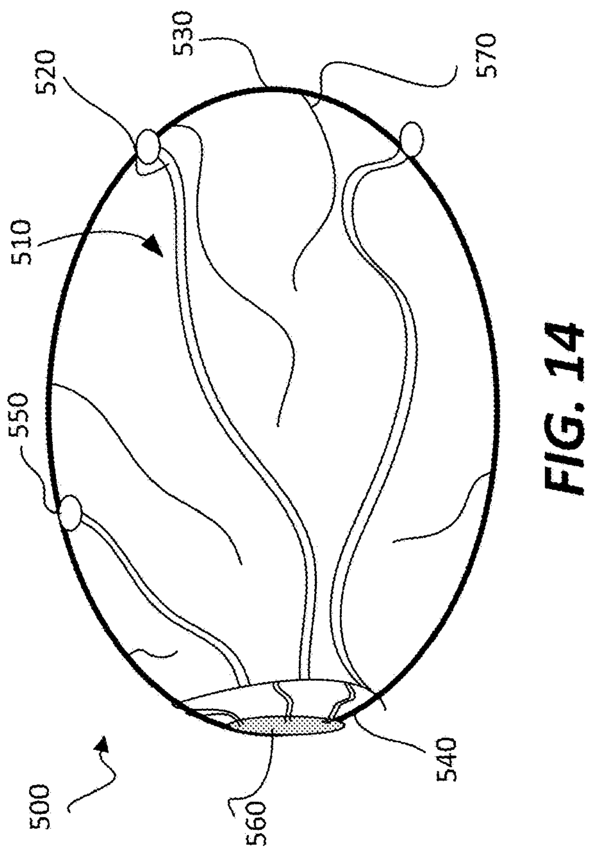

FIG. 14 illustrates an eyeball structure of the eye-imaging training apparatus according to some embodiments. The eye-imaging training apparatus described herein may be utilized with any of the models described herein and can include an eyeball structure 500 including a microfluidic network 510. For example, the microfluidic network 510 may include a plurality of channels 520 configured to receive a fluid. In some embodiments, one or more channels 520 are interconnected. The channels 520 can extend from a first end 530 of the eyeball structure 500 to a second end 540 of the eyeball structure 500 adjacent the iris 560. The channels 520 can receive a fluid from a port 550 or via other channels. In some embodiments, the eyeball structure 500 includes a plurality of ports 550 for each channel 520. In this way, fluid can be selectively controlled to each region of the microfluidic network 510 of the eyeball structure 500. The channels 520 in the eyeball structure 500 can mimic the function of fluidically active veins. In some embodiments, the eye-imaging training apparatus can include one or more injection ports to deliver a fluid to the eyeball structure 500. The fluid can travel through the eye-imaging training apparatus to the microfluidic network 510 in the eyeball structures 500. In some embodiments, the eye-imaging training apparatus may include a pump to move fluid through the microfluidic network 510. In some embodiments, the pump is configured to control the pressure of the fluid in the eyeball structure 500. For example, the pump can provide additional fluid to the microfluidic network 510 to increase the pressure of the eyeball structure 500, which can serve as an indicator of glaucoma.

In some embodiments, the eyeball structure 500 can include one or more membranes 570 disposed on the surface of the eyeball structure 500. The membranes 570 may comprise a fluorescent material. In some embodiments, a portion of the membranes 570 may comprise a fluorescent material. In some embodiments, microfluidic network may include a static fluid.

The eye-imaging training apparatus including eyeball structures 500 can be useful for training individuals to analyze blood flow through the eye. For example, the eyeball structures 500 having a microfluidic network 510 can be used for training caregivers to conduct optical coherence tomography, Doppler imaging, and other eye-imaging techniques that can analyze blood flow in the eyes. Additionally, an eye-imaging training apparatus including an injection port allows caregivers to practice delivering fluids into the eye-imaging training apparatus. For example, a caregiver can practice injecting fluorescein into the eye-imaging training apparatus. As the fluorescein dye passes through the microfluidic network of the eye structure, photographs can be taken with an eye-imaging camera to record the blood flow to the retina. The fluorescein dye can travel through the microfluidic network and the caregiver can take images of the microfluidic network at specific time periods after injection. The photographs can reveal abnormal blood vessels or damage to the lining underneath the retina. Using the microfluidic network described herein, processes that simulate eye imaging for a fluorescein angiography can be performed. In some embodiments, specific channels of the microfluidic network can be closed such that caregivers can practice analyzing functioning and non-functioning channels in the eye. The eye-imaging training apparatus described herein can provide a standardized model for training calibration, alignment, and targeting. Since the devices described herein simulate processes observed in an eye, equipment, including cameras, can be calibrated and quality confirmed and operators can be trained using the devices described herein.

In some embodiments, the eyeball structure 500 may include an iris 560 including electronics. For example, the iris 560 may include one or more sensors, a processor in communication with the light sensors, and an expandable member in communication with the processor. In some embodiments, the sensors can be a light sensor. The light sensor can be configured to measure the amount of light contacting the eyeball structure. Based on the detected amount of light, the iris 560 can contract or expand similar to a human eye in response to light. For example, the processor can process information from the light sensor to expand or retract the expandable member.

In some embodiments, the microfluidic channels may comprise a material that is configured to retract or close. For example, a laser can be used to cinch or close one or more of the microfluidic channels to stop or prevent fluid flow in a specific channel. Thus, embodiments of the present invention can simulate the use of a laser to intentionally block veins. As an example, the laser could impinge on one of the microfluidic channels and the operator could verify that the microfluidic channel, simulating a vein, was closed (e.g., by melting) and that fluid no longer runs through it. In some embodiments, the microfluidic channels may include a valve in communication with one or more sensors. The sensors may be configured to detect a laser. When the sensor detects a laser, a signal can be sent to the valve to close the valve to prevent any fluid flow.

Figure 15:
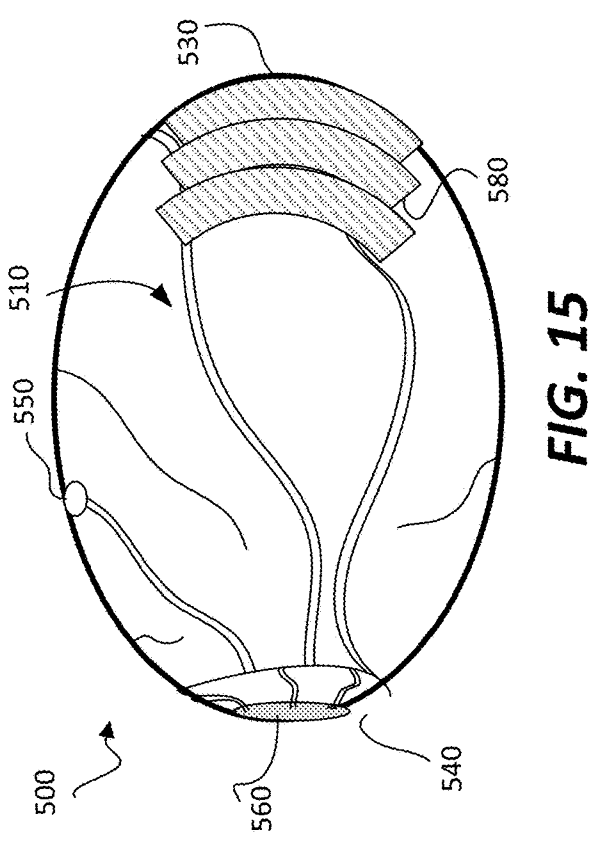
FIGS. 14 and 15 illustrate a schematic diagram of the eyeball structure of the eye-imaging training apparatus including a microfluidic network according to some embodiments.

FIG. 15 provides another embodiment of the eyeball structure 500. The eyeball structure 500 can include a plurality of layers 580. The layers 580 may comprise a polymeric material (e.g., polymer film). For example, the layers 580 can be a plurality of layered thin-films comprising plastic disposed at the first end 530 of the eyeball structure 500. In some embodiments, the layers 580 can simulate the tissue layers in the back end of a human or animal eye. A caregiver can train ablating the layers 580 of the eyeball structure 500 to simulate a corneal surface ablation procedure. In some embodiments, the eyeball structure 500 can include fibers or membranes. The fibers and membranes can resemble veins within a human or animal eye. For example, the eyeball structure 500 can include a plurality of fibers embedded within the eyeball member.

In some embodiments, the eyeball structure 500 may include a thread on the surface of the eyeball structure. The thread can comprise a fluorescent material. In some embodiments, the thread is a glow-in-the-dark material. The thread can provide a three-dimensional structure on the eyeball structure 500. In some embodiments, the eyeball structure 500 includes glow-in-the-dark fibers to resemble veins. The eyeball structure 500 can be disposable, which is suitable for surgical practice. In addition to fibers or threads resembling veins, other embodiments provide structures that simulate other physical structures that are important in the eye anatomy. As an example, larger structures like tumors are difficult to image because it is difficult to get the whole structure in focus at the same time. Accordingly, embodiments of the present invention provide large structures that enable an operator to practice imaging of these large structures. Additionally, structures that rise up into the vitreous fluids of the eye closer to the center are also useful for practice.

Figure 16:
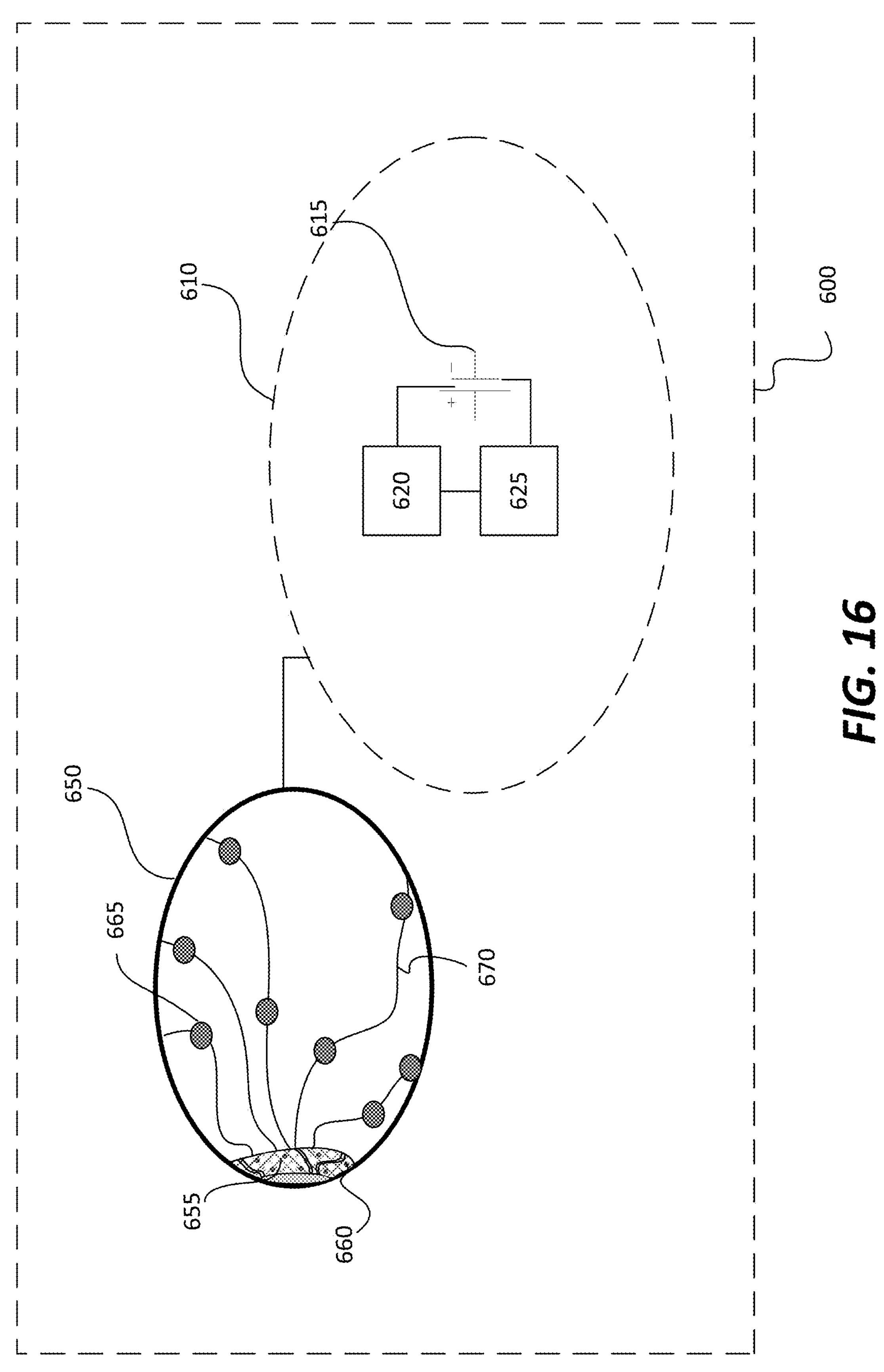
FIG. 16 illustrates a schematic diagram of the eyeball structure of the eye-imaging training apparatus according to some embodiments.

FIG. 16 illustrates an embodiment of an internal structure of an eye-imaging training apparatus 600. The eye-imaging training apparatus 600 may include electrical components that provide an electrical signal to the eyeball structure 650. For example, the eye-imaging training apparatus 600 may include an electrical circuit that can deliver an electrical signal to the eyeball structure 650 in response to inputs from one or more sensors.

The housing 610 may include electrical components that are in communication with the eyeball structure 650. For example, the housing 610 may include a power source 615. In some embodiments, the power source 615 can be a rechargeable battery. The housing 610 may include a processor 620 and an electrical pulse generator 625 that are coupled to the power source 615. The processor 620 can be configured to receive data from one or more sensors 665 disposed on the eyeball structure 650. The processor 620 is configured to process the data from the one or more sensors 665 to provide an output to the electrical pulse generator 625. For example, the sensors 665 can detect light on the eyeball structure 650. The processor 620 is configured to process data received from the one or more sensors 665. Based on the data from the sensors 665, the processor 620 can send an output signal to the electrical pulse generator 625 to generate one or more electrical pulses.

The eyeball structure 650 includes one or more sensors 665. The sensors 665 may be disposed on the surface of the eyeball structure 650 or in layers within the eyeball structure 650. In some embodiments, the one or more sensors 665 comprises a photodiode. The eyeball structure 650 may include wiring 670 to couple the sensors 665 to different components of the eyeball structure 650. The eyeball structure 650 includes an electrically conductive substrate 655. The electrically conductive substrate 655 may comprise a web of interconnected wiring. The electrically conductive substrate 655 may include one or more discrete regions 660. The discrete regions 660 is configured to receive an electrical pulse. In some embodiments, the discrete regions 660 are configured to expand in response to an electrical pulse. The electrical pulse generator 625 can deliver an electrical pulse to one or more of the plurality of discrete regions 660 of the electrically conductive layer in response to a signal received from the processor 620. This embodiment can simulate an electroretinography test which measures the electrical response of various cells in the retina.

Figure 17:
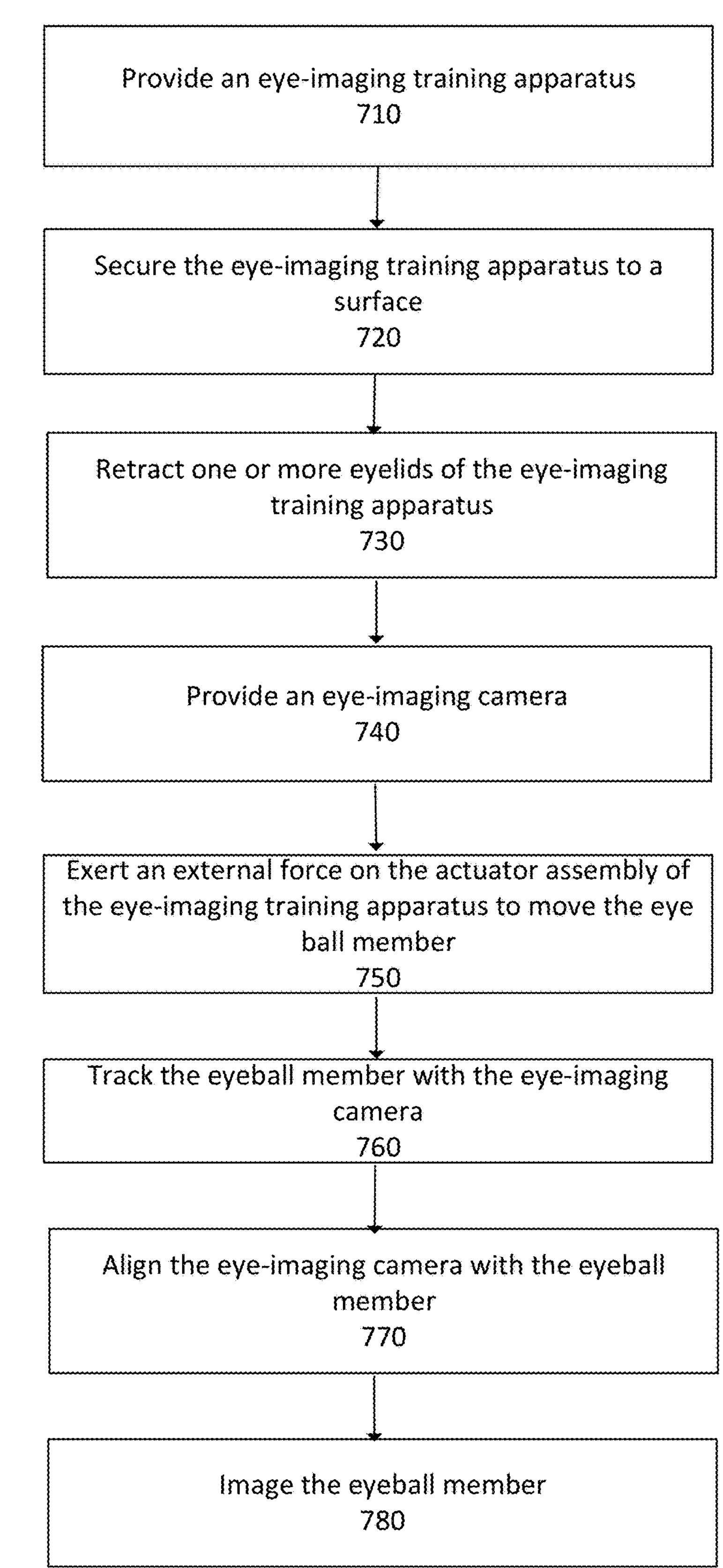
FIG. 17 provides a flow diagram of a method of imaging an eyeball member of an eye-imaging training apparatus according to some embodiments.

FIG. 17 provides a flow diagram of a method of training a caregiver to use an eye-imaging camera 700. The method includes providing an eye-imaging training apparatus 710. The eye-imaging training apparatus may include a housing comprising a front end and a rear end. The front end of the housing can be removably attached to the rear end to provide an interior volume of the housing. The front end of the housing includes a first eye socket and a second eye socket formed. An eye structure is disposed in each of the first eye socket and the second eye socket. The eye structure includes an eyeball member and a fastening member. The fastening member extends from a distal end of the eyeball member. The eye-imaging training apparatus includes an actuator assembly disposed in the interior volume of the housing. The actuator assembly includes a pivot member and a receiving member in communication with the pivot member. The receiving member is configured to receive the fastening member of the eyeball structure such that actuating the pivot member is configured to move the eyeball member within at least one of the first eye socket and the second eye socket. The eye-imaging training apparatus includes a base material disposed over at least the front end of the housing. The base material includes a pair of retractable eyelids configured to rest over the eyeball member disposed in the first eye socket and the second eye socket.

The method includes securing the eye-imaging training apparatus on a surface 720. In some embodiments, the eye-imaging training apparatus is placed on a flat surface. In some embodiments, the eye-imaging training apparatus can be secured on the surface using a fastener (e.g., a belt). For example, the eye-imaging training apparatus can be secured to a table using fasteners or a person can hold the eye-imaging training apparatus in place for eye imaging.

The method includes retracting one or more of the retractable eyelids 730. For example, method may include using a speculum to retract the eyelids of the eye-imaging training apparatus. The speculum can retract and hold the top and bottom portions of the eyelid covering the eyeball members of the eye-imaging training apparatus in an open position. In some embodiments, a first speculum is used to retract the eyelid covering the first eyeball member and a second pair of speculum can be used to retract the eyelid covering the second eyeball member. In this way, a caregiver can train using speculum to retract the eyelids of the eye-imaging training apparatus. The caregiver can practice using the speculum to retract the bottom portion of the eyelid and the top portion of the eyelid using the speculum.

The method includes providing an eye-imaging camera for imaging the eyeball member 740. The eye-imaging camera can be any eye-imaging device. For example, the eye-imaging camera can be configured to perform intraoperative optical coherence tomography (OCT), confocal scanning laser ophthalmoscopy, scanning laser polarimetry, or any other eye-imaging techniques.

The method includes exerting an external force on the actuator assembly to move the eyeball member within at least one of the first eye socket and the second eye socket 750. The eye-imaging training apparatus includes an actuator assembly that is configured to move the eye structures. For example, an external force can be exerted on the actuator assembly of the eye-imaging training apparatus to move the eyeball member. This action can force the eyeball members of the eye structures to move in any direction within the eye socket of the housing. For example, the actuator assembly can move the eyeball member in an The method includes tracking the eyeball member in the first eye socket and the second eye socket with the eye-imaging camera 760. A caregiver can track the eyeball member of the eye-imaging training device with an eye-imaging camera. For example, as the eyeball member moves within the socket, a caregiver can practice tracking the eyeball member with the eye-imaging camera. The method includes aligning the eye-imaging camera with the eyeball member in the first eye socket and the second eye socket 770. Once the camera is aligned, the method includes imaging the eyeball member 780.

In some embodiments, the eye-imaging training apparatus further includes a microfluidic network comprising a plurality of channels. The eyeball member may include a portion of the plurality of channels. The method may further include pumping a volume of fluid to the microfluidic network. In some embodiments, the fluid comprises a fluorescent dye. The method may include determining a time for the fluid to reach the channels disposed on the eyeball member. In some embodiments, the method also includes imaging the channels as fluid moves through the channels disposed in the eyeball member based on the determined time.

In some embodiments, the eyeball member of the eye-imaging training apparatus includes one or more sensors and an electrically conductive substrate. The electrically conductive substrate may include a plurality of discrete regions. In some embodiments, the eye-imaging training apparatus includes a power, a processor coupled to the power source, and a pulse generator in communication with the processor. The processor may be configured to process data received from the one or more sensors. The pulse generator may be configured to send an electrical pulse to one or more of the plurality of discrete regions of the electrically conductive substrate in response to a signal received from the processor.

In some embodiments, the method may include directing a light source at the eyeball member comprising the one or more sensors. The method may include processing, using the processor, data provided by the one or more sensors. The method may include sending an electrical pulse, using the pulse generator, to one or more of the plurality of discrete regions of the electrically conductive substrate in response to a signal received from the processor. The method may include imaging the eyeball member as the electrical pulse travels to one or more of the plurality of discrete regions.

It should be appreciated that the specific steps illustrated in FIG. 17 provide a particular method of attaching an apparatus to an eye-imaging camera according to some embodiments. Other sequences of steps may also be performed according to alternative embodiments. For example, alternative embodiments of the present invention may perform the steps outlined above in a different order. Moreover, the individual steps illustrated in FIG. 17 may include multiple sub-steps that may be performed in various sequences as appropriate to the individual step. Furthermore, additional steps may be added or removed depending on the particular applications. One of ordinary skill in the art would recognize many variations, modifications, and alternatives.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An eye-imaging training apparatus comprising:

a housing comprising a front end and a rear end, wherein the front end is removably attached to the rear end to provide an interior volume of the housing;

a first eye socket and a second eye socket formed on the front end of the housing;

an eye structure disposed in each of the first eye socket and the second eye socket, wherein the eye structure comprises an eyeball member and a fastening member, wherein the fastening member extends from a distal end of the eyeball member;

an actuator assembly disposed in the interior volume of the housing, the actuator assembly comprising a pivot member and a receiving member in communication with the pivot member, the receiving member configured to receive the fastening member of the eye structure, wherein actuating the pivot member is configured to move the eyeball member within at least one of the first eye socket and the second eye socket; and a base material disposed over at least the front end of the housing;

wherein the eyeball member comprises an electrically conductive substrate coupled to one or more sensors, wherein at least one sensor detects a level of light.

2. The eye-imaging training apparatus of claim 1, wherein the first eye socket and the second eye socket comprise a concave receptacle including an aperture, and wherein the fastening member of the eye structure is configured to extend through the aperture into the interior volume of the housing.

3. The eye-imaging training apparatus of claim 1, wherein the pivot member comprises a first arm and a second arm, wherein each of the first arm and the second arm includes a first end comprising a knob and a second end comprising the receiving member, wherein the receiving member is configured to receive the fastening member of the eye structure.

4. The eye-imaging training apparatus of claim 3, wherein the fastening member of the eye structure is removably coupled to the receiving member of the actuator assembly;

wherein the first arm and the second arm each extend out of the housing such that the knob is disposed outside the housing;

wherein exerting a force on the knob is configured to act on one of the first arm and the second arm to move the eyeball member in the first eye socket and the second eye socket; and wherein the eyeball member is configured to move along an X-axis, a Y-axis, and/or a Z-axis, with respect to a long axis of the eye-imaging training apparatus, based on the exerted force.

5. The eye-imaging training apparatus of claim 1, wherein the base material comprises a silicone-based material that is configured to be removably attached to a portion of the front end of the housing, and wherein the base material comprises a pair of retractable eyelids that is configured to rest over the eyeball member disposed in the first eye socket and the second eye socket.

6. The eye-imaging training apparatus of claim 1, wherein the front end of the housing comprises the first eye socket, the second eye socket, a nose region, a mouth region, and contour features, wherein the rear end comprises a pair of opposing ear regions; and wherein the base material includes a pair of retractable eyelids configured to be disposed over the first eye socket and the second eye socket, a nose configured to be disposed over the nose region, and a mouth configured to be disposed over the mouth region.

7. The eye-imaging training apparatus of claim 1, wherein the pivot member is coupled to the receiving member via a hinge, wherein the receiving member includes at least two receiving members configured to receive the fastening member of the eye structure;

wherein the pivot member comprises a unitary structure extending from a first end of the housing to a second end of the housing, wherein each distal end of the pivot member comprises an ear structure; and wherein the ear structure comprises a gripping region to actuate the ear structure, wherein actuating the ears acts on the fastening member coupled to the receiving member to translate the eyeball member along an X-axis, a Y-axis, or a Z-axis, with respect to a long axis of the eye-imaging training apparatus.

8. The eye-imaging training apparatus of claim 1, further comprising a microfluidic network comprising a plurality of channels, wherein the eyeball member comprises a portion of the plurality of channels, and wherein the microfluidic network is coupled to a pump configured to pump fluid through the plurality channels of the microfluidic network via an injection port in the housing.

9. The eye-imaging training apparatus of claim 1, wherein the eyeball member comprises a first end and a second end, wherein the eyeball member comprises a plurality of layers comprising polymer films disposed at the second end of the eyeball member.

10. The eye-imaging training apparatus of claim 1, wherein the eyeball member comprises one or more membranes disposed on a surface of the eyeball member, wherein a portion of the membranes comprise a fluorescent material.

11. The eye-imaging training apparatus of claim 1, wherein the eyeball member comprises a plurality of fibers embedded within the eyeball member.

12. The eye-imaging training apparatus of claim 1, wherein the housing comprises:

a power source;

a processor coupled to the power source, wherein the processor is configured to process data received from the one or more sensors; and a pulse generator in communication with the processor, wherein the pulse generator is configured to send an electrical pulse to one or more discrete regions of the electrically conductive substrate in response to a signal received from the processor; and wherein the one or more sensors comprises a photodiode.

13. A system for training a caregiver to perform eye imaging, the system comprising:

providing an eye-imaging training apparatus comprising:

a housing comprising a front end and a rear end, wherein the front end is removably attached to the rear end to provide an interior volume of the housing;

a first eye socket and a second eye socket formed on the front end of the housing;

an eye structure disposed in each of the first eye socket and the second eye socket, wherein the eye structure comprises an eyeball member and a fastening member, wherein the fastening member extends from a distal end of the eyeball member, wherein the eyeball member comprises an electrically conductive substrate coupled to one or more sensors, wherein at least one sensor detects a level of light;

an actuator assembly disposed in the interior volume of the housing, the actuator assembly comprising a pivot member and a receiving member in communication with the pivot member, the receiving member configured to receive the fastening member of the eye structure, wherein actuating the pivot member is configured to move the eyeball member within at least one of the first eye socket and the second eye socket; and a base material disposed over at least the front end of the housing, wherein the base material comprises a pair of retractable eyelids configured to rest over the eyeball member disposed in the first eye socket and the second eye socket;

one or more speculum configured to retract the retractable eyelids; and an eye-imaging device.

14. The system of claim 13, wherein the eye-imaging training apparatus further comprises a microfluidic network comprising a plurality of channels, wherein a portion of the plurality of channels are disposed on the eyeball member; and wherein the system further comprises a pump to provide a volume of fluid to the microfluidic network.

15. The system of claim 13, wherein the electrically conductive substrate includes a plurality of discrete regions, and wherein the housing comprises:

a power source;

a processor coupled to the power source, wherein the processor is configured to process data received from the one or more sensors; and a pulse generator in communication with the processor, wherein the pulse generator is configured to send an electrical pulse to one or more of the plurality of discrete regions of the electrically conductive substrate in response to a signal received from the processor.

16. A method of training a caregiver to use an eye-imaging camera, the method comprising:

providing an eye-imaging training apparatus comprising:

a housing comprising a front end and a rear end, wherein the front end is removably attached to the rear end to provide an interior volume of the housing;

a first eye socket and a second eye socket formed on the front end of the housing;

an eye structure disposed in each of the first eye socket and the second eye socket, wherein the eye structure comprises an eyeball member and a fastening member, wherein the fastening member extends from a distal end of the eyeball member;

an actuator assembly disposed in the interior volume of the housing, the actuator assembly comprising a pivot member and a receiving member in communication with the pivot member, the receiving member configured to receive the fastening member of the eye structure, wherein actuating the pivot member is configured to move the eyeball member within at least one of the first eye socket and the second eye socket; and a base material disposed over at least the front end of the housing, wherein the base material comprises a pair of retractable eyelids configured to rest over the eyeball member disposed in the first eye socket and the second eye socket;

securing the eye-imaging training apparatus on a surface;

retracting one or more of the retractable eyelids;

providing an eye-imaging camera for imaging the eyeball member;

exerting an external force on the actuator assembly to move the eyeball member within at least one of the first eye socket and the second eye socket;

tracking the eyeball member in the first eye socket and the second eye socket with the eye-imaging camera;

aligning the eye-imaging camera with the eyeball member in the first eye socket and the second eye socket; and imaging the eyeball member.

17. The method of claim 16, wherein retracting the pair of eyelids comprises inserting a speculum to open a top portion and a bottom portion of each eyelid.

18. The method of claim 16, wherein the eye-imaging training apparatus further comprises a microfluidic network comprising a plurality of channels, wherein a portion of the plurality of channels are disposed on the eyeball member; and wherein the method further comprises:

pumping a volume of fluid to the microfluidic network, wherein the volume of fluid comprises a fluorescent dye; and determining a time for the fluid to reach the channels disposed on the eyeball member; and imaging the channels as the fluid moves through the channels disposed in the eyeball member based on the determined time.

19. The method of claim 16, wherein the eyeball member comprises one or more sensors and an electrically conductive substrate, wherein the electrically conductive substrate includes a plurality of discrete regions, and wherein the housing comprises:

a power source;

a processor coupled to the power source, wherein the processor is configured to process data received from the one or more sensors; and a pulse generator in communication with the processor, wherein the pulse generator is configured to send an electrical pulse to one or more of the plurality of discrete regions of the electrically conductive substrate in response to a signal received from the processor.

20. The method of claim 19, wherein the method further comprises:

directing a light source at the eyeball member comprising the one or more sensors;

processing, using the processor, data provided by the one or more sensors;

sending an electrical pulse, using the pulse generator, to one or more of the plurality of discrete regions of the electrically conductive substrate in response to a signal received from the processor; and imaging the eyeball member as the electrical pulse travels to one or more of the plurality of discrete regions.

* * * * *